United States Patent [19]

Brigham

[11] Patent Number: 4,634,948
[45] Date of Patent: Jan. 6, 1987

[54] STEPPING MOTOR WINDING FOR BIPOLAR DRIVE

[75] Inventor: Robert N. Brigham, Monroe, Conn.

[73] Assignee: The Superior Electric Company, Bristol, Conn.

[21] Appl. No.: 735,209

[22] Filed: May 17, 1985

[51] Int. Cl.⁴ .................................................. H02P 8/00
[52] U.S. Cl. ........................................ 318/696; 318/685
[58] Field of Search ............... 318/696, 685; 310/49 R

[56] References Cited

U.S. PATENT DOCUMENTS

| | | | |
|---|---|---|---|
| 2,706,270 | 4/1955 | Steele | 318/283 |
| 3,041,516 | 6/1962 | Bailey | 318/696 |
| 3,260,871 | 7/1966 | Lang | 310/49 R |
| 4,164,696 | 8/1979 | Kastilahn et al. | 318/696 |

Primary Examiner—William M. Shoop, Jr.
Assistant Examiner—Saul M. Bergmann
Attorney, Agent, or Firm—John H. Crozier

[57] ABSTRACT

A stator for a stepping motor, the stator having a plurality of salient poles and at least two windings, each winding comprising at least two conductors each of which is wound upon one or more separate poles. The conductors of each winding may be connected either in series or in parallel. This winding arrangement is particularly advantageous when the conductors of each winding are connected in series and driven with a bipolar drive, as problems which exist with bifilar windings, such as high conductor-to-conductor potentials and inductive spikes, are avoided.

8 Claims, 10 Drawing Figures

STEPPING MOTOR WINDING FOR BIPOLAR DRIVE

BACKGROUND OF THE INVENTION

1. Technical Field

This invention relates to stepping motors, and more particularly to an improved arrangement of the windings on the stators of such motors.

2. Background Art

Stepping motors are well-known devices for providing incremental motion and have utility in a wide variety of applications requiring the accurate positioning of mechanical and electromechanical machinery. Typically, a stepping motor includes a stationary member, or stator, and a moving member, the two members having magnetically interacting structures, with successive changes in electromagnetic fields causing incremental changes in the position of the moving member. The stator typically includes a plurality of electromagnetic salient poles. Each pole is excited by electric current passing through a coil wound upon the pole. The coil on one pole may be connected in series or parallel with the coil(s) of one or more additional poles in such a sense that the flux polarities of the poles are appropriate. Such a coil or connected coils are commonly referred to as a "winding".

Heretofore, such a stepping motor winding has typically been "bifilar" in arrangement; that is, the winding consisted of two conductors wound physically parallel. Originally, the bifilar winding was driven with a unipolar drive, whereby one of the parallel conductors was energized with electric current flowing in one direction to provide one polarity of the pole on which the bifilar winding was wound and, when the opposite polarity was required, the other parallel conductor was energized with electric current flowing in the opposite direction, producing the opposite polarity of the pole.

In a further development, bipolar drives were applied to excite the windings of a bifilar-wound stepping motor. This provides simpler drive circuitry and also permits either series or parallel connection of the two conductors, thus providing high impedance for optimum performance at low stepping speeds (series connection) and low impedance for optimum performance at high stepping speeds (parallel connection). In the series connection arrangement, the end of one parallel conductor is connected to the beginning of the other parallel conductor, so that the exciting current flows in one direction through the first conductor and then in the same direction through the second conductor. In the parallel connection arrangement, the end-to-beginning connection is open and current is connected to flow in parallel through both conductors from their beginnings to their ends.

While the bipolar drive has heretofore been found generally satisfactory for exciting bifilar windings, the arrangement has been found to have certain disadvantages when the conductors are connected in series. In order to improve stepping performance, increasingly higher drive voltages are used across the stepping motor windings, but these voltages are limited by the high potential which necessarily results between the individual conductors of the bifilar winding when connected in series. This high potential can cause breakdown of the insulation covering (and separating) the conductors. Another disadvantage of the bifilar winding connected in series is that the drive system must deal with rather large voltage "spikes" due to inductive coupling between the two conductors, which also can cause insulation breakdown.

SUMMARY OF THE INVENTION

The present invention overcomes the abovedescribed limitations of the bifilar winding when driven with a bipolar drive, by providing a monofilar winding as hereinafter described, which winding permits both series and parallel connection of the poles. This allows the use of greater drive voltages while eliminating the high conductor-to-conductor potential and the induction problems described above. In addition, the monofilar winding is somewhat less expensive to manufacture than the bifilar winding.

DESCRIPTION OF THE PREFERRED EMBODIMENT

Figure 1:
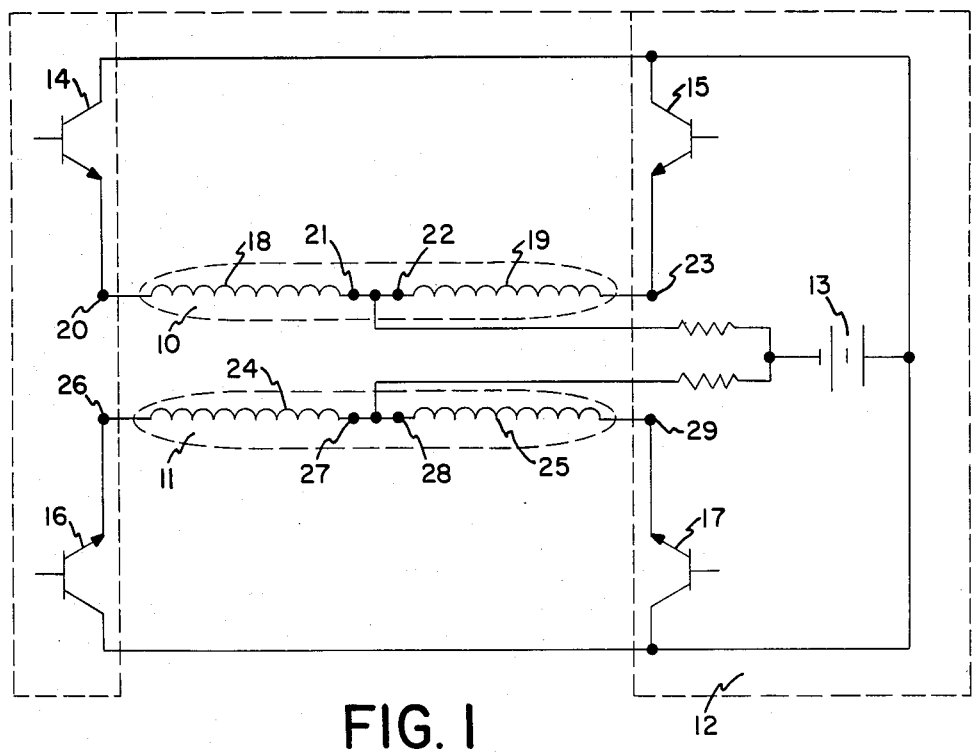
FIG. 1 is a schematic of a conventionally-wound stepping motor stator with a unipolar drive, with two windings shown.

Referring to the Drawing, FIG. 1 is a schematic of a conventional bifilar arrangement excited by a unipolar drive and includes windings 10 and 11. The windings 10 and 11 are connected as shown to a unipolar drive 12 which includes a unidirectional power source 13 and switches 14, 15, 16, and 17, all connected as shown. Winding 10 includes two conductors: 18 having end connections 20 and 21, and 19 having end connections 22 and 23, with the two conductors being wound physically parallel such that the connections 20 and 21 of conductor 18 are located adjacent the connections 22 and 23 of conductor 19, respectively. Likewise, winding 11 includes two conductors 24 and 25 having end connections 26, 27, and 28, 29, respectively, with the two conductors being wound physically parallel such that the connections 26 and 27 of conductor 24 are located adjacent the connections 28 and 29, respectively, of conductor 25. While not shown, each winding may be wound upon more than one stator pole. The structure and the fundamentals of the operation of a rotary stepping motor are described in U.S. Pat. No. 2,982,872 to Fredrickson and are incorporated herein by reference.

In operation, the windings are energized sequentially, with each conductor of a winding carrying current in one direction. For example, when switch 14 is closed, current flows from the power source 13, through switch 14, and through conductor 18 in the direction of connection 20 to connection 21, providing one polarity of the pole(s) upon which the winding 10 is wound. When switch 14 is opened and switch 15 is closed, current flows from the power source 13, through switch 15, and through conductor 19 in the direction of connection 23 to connection 22, thus providing the opposite polarity of those same pole(s) upon which winding 10 is wound.

In a similar manner, the closing of switch 16, provides one polarity of the pole(s) upon which the winding 11 is wound; and the opening of switch 16 and the closing of switch 17 provides the opposite polarity of the pole(s) upon which winding 11 is wound.

The stepping of the motor may be controlled by energizing only one conductor at a time or by simultaneously energizing one conductor of each winding, depending on the amount of torque or step accuracy required.

Figure 2:
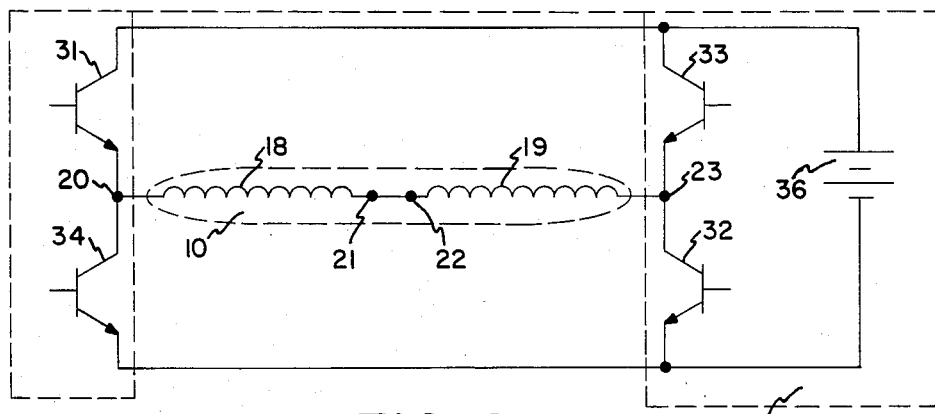
FIG. 2 is a schematic of a conventionally-wound stepping motor stator with a bipolar drive, with one winding shown.

FIG. 2 shows the bifilar-wound conductors 18 and 19 of winding 10 of FIG. 1 connected in series and driven by a bipolar drive 30 which includes switches 31 through 34 and a unidirectional source of power 36, all connected as shown. Here, current flows in the same direction through both conductors 18 and 19 in series. For example, when switches 31 and 32 are closed, current from the power source 35 enters the winding 10 at connection 20, flows through conductor 18 to connection 21, enters conductor 19 at connection 22, and flows through conductor 19 to connection 23, producing one polarity of the pole(s) upon which winding 10 is wound. When switches 31 and 32 are opened and switches 33 and 34 are closed, the current will flow through the winding 10 in the opposite direction, producing the opposite polarity of the pole(s) upon which winding 10 is wound. Remembering that conductors 18 and 19 are physically parallel, it will be understood that there exists a potential between the coils when connected in this manner equal to approximately one-half the drive voltage. Of course, the higher the drive voltage, the higher is this potential, and the higher will be the potential of inductive spikes. In a similar manner, a bipolar drive circuit, identical to circuit 30 would be employed to excite winding 11 (not shown on FIG. 2).

Figure 3:
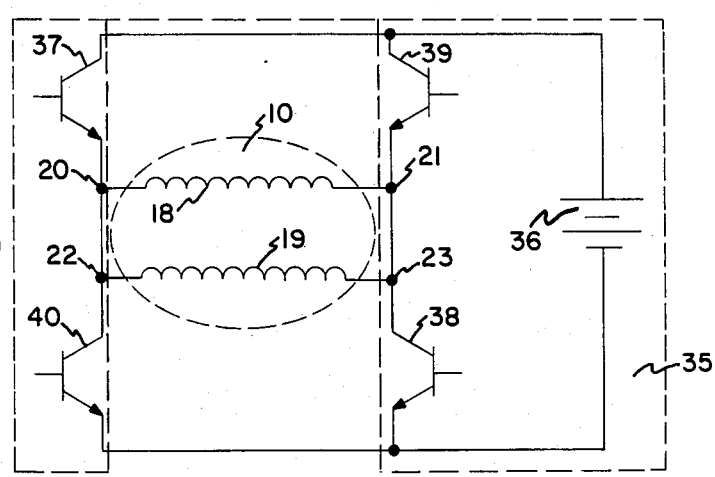
FIG. 3 is a schematic of another conventionally-wound stepping motor stator with a bipolar drive, with one winding shown.

FIG. 3 is a schematic showing the bifilar conductors 18 and 19 of winding 10 of FIG. 1 connected in parallel and driven by a bipolar drive 35 which includes a unidirectional power source 36 and switches 37, 38, 39, and 40 all connected as shown. Here, the drive control is identical to that described in relation to FIG. 2, with the closing of switches 37 and 38 producing one polarity, and the closing of switches 39 and 40 producing the opposite polarity, of the poles upon which the winding 10 is wound. Again, a bipolar drive circuit, identical to circuit 35, would be employed to excite winding 11 (not shown on FIG. 3).

The parallel arrangement of the conductors 18 and 19 on FIG. 3 precludes the existence of any conductor-to-conductor potential, but does not afford the low-speed optimum performance achieved with series-connected conductors.

Figure 4:
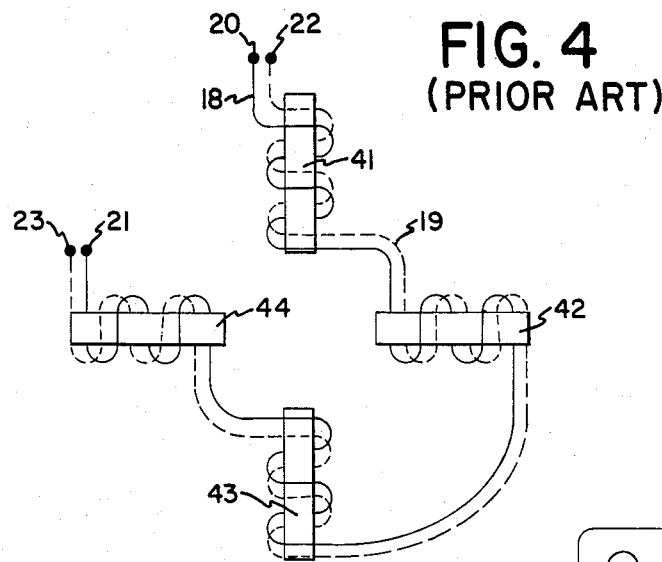
FIG. 4 is a schematic of a conventional bifilar winding, with one winding shown.

FIG. 4 shows schematically how the conductors 18 and 19 of the preceding FIGS. 1, 2, and 3 are disposed on stator poles 41, 42, 43, and 44, which, in this example, may comprise one winding of an eight-pole, two-winding stepping motor. Conductor 18 begins at connection 20 which is adjacent to the beginning of conductor 19 at connection 22. As shown, the conductors 18 and 19 are wound together in a parallel manner around pole 41, then pole 42, then pole 43, and finally pole 44 where they terminate at connections 22 and 24, respectively. As described earlier, if a series connection of conductors 18 and 19 is desired, connections 21 and 22 would be joined so that current would flow from connection 20, through conductor 18 to connection 21, to connection 22, through conductor 19 to connection 23. Thus, it will be understood that a conductor-to-conductor potential exists equal to approximately one-half the potential between connections 20 and 23. If a parallel connection is desired, the drive potential would be connected across the conductors 18 and 19 from connections 20 to 21 and 22 to 23, respectively.

Figure 5:
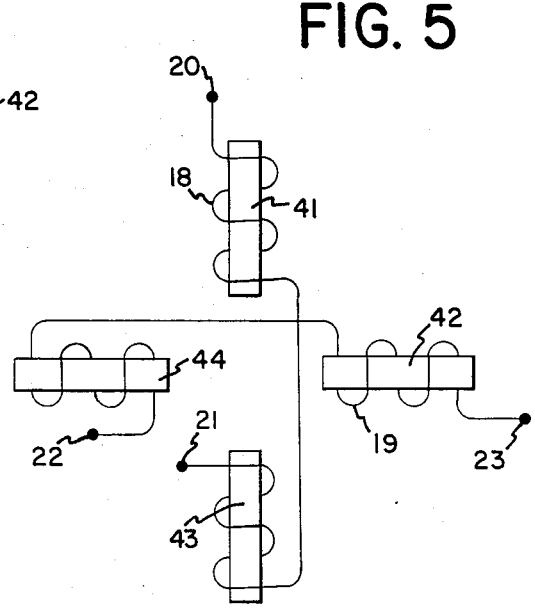
FIGS. 5 through 10 are schematics of various embodiments of the monofilar winding of the present invention, with one winding shown.

FIG. 5 shows one embodiment of the present invention, using the identifying numerals as described above, for one winding of an eight-pole, two-winding motor. Here, conductors 18 and 19 are wound upon different poles, with conductor 18 being wound serially on poles 41 and 43 and conductor 19 being wound serially on poles 42 and 44. Since each conductor is wound about two, instead of four poles, it is necessary, with this arrangement, to double the number of turns of wire on each coil to produce the same amount of flux in a pole with a given amount of drive current. A similar arrangement would be provided for the other winding of the motor.

Figure 6:
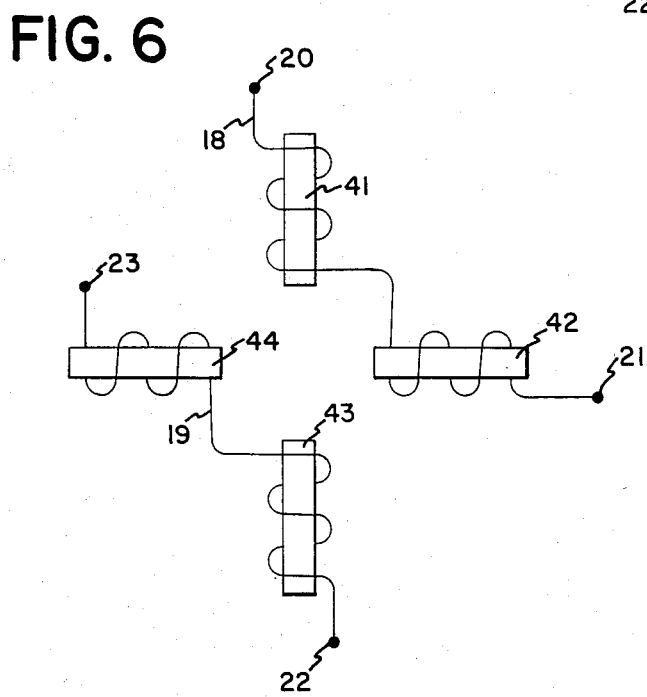

FIG. 6 is an alternative embodiment of the present invention. Here, conductors 18 and 19 are again wound on separate sets of poles, but, in this case, each conductor is wound serially on adjacent poles in the set of poles served by the respective conductors. Thus, conductor 18 is serially wound on poles 41 and 42 and conductor 19 is serially wound on poles 43 and 44.

Figure 7:
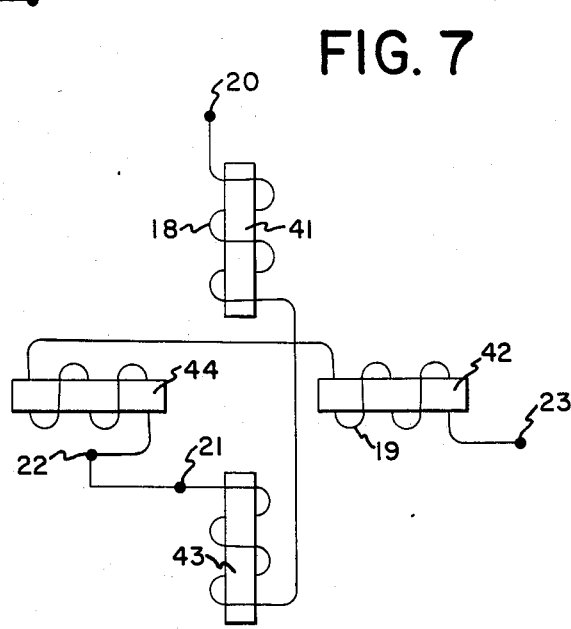
Figure 8:
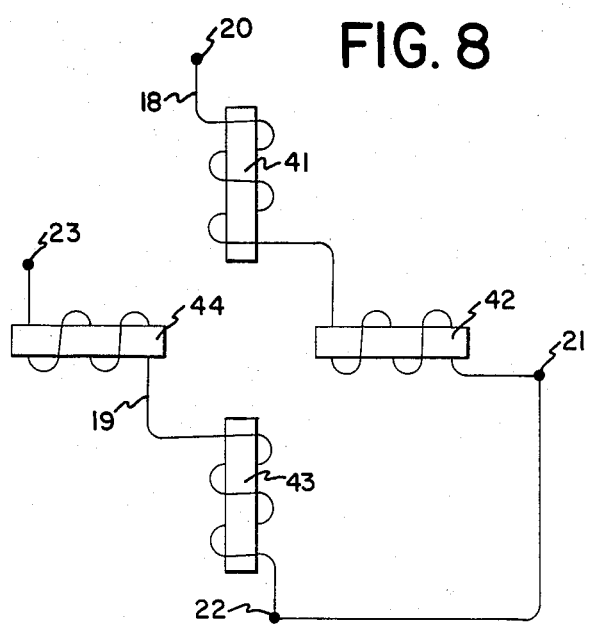
Figure 9:
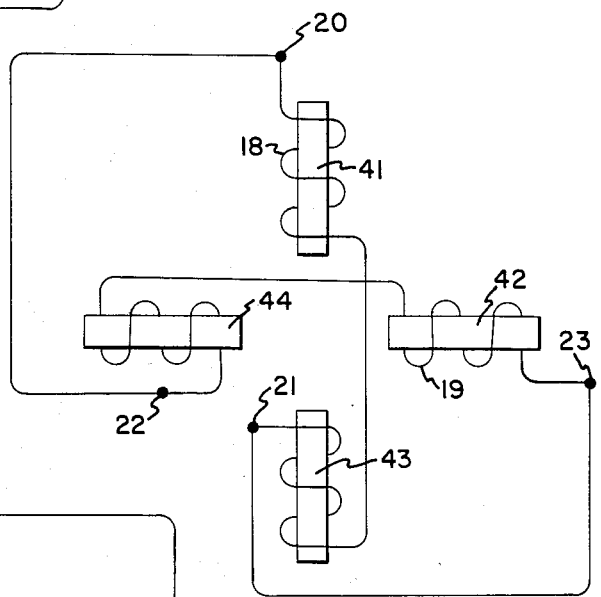
Figure 10:
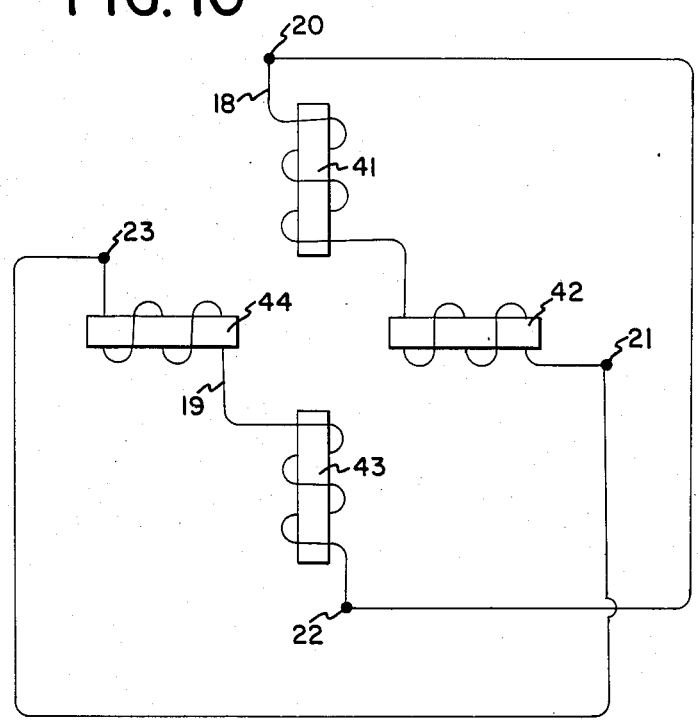

In either of the configurations shown on FIGS. 5 and 6, the conductors 18 and 19 may be connected in series or in parallel, depending on whether low-speed or high-speed torque were important, respectively. Depending on whether series or parallel connection of the conductors 18 and 19 is desired, they can be driven by the bipolar drives as shown on FIG. 2 or FIG. 3, respectively. If series connection is desired, connections 21 and 222on FIGS. 5 and 6 would be joined, as shown on FIGS. 7 and 8 respectively, with the drive voltage, "V", impressed across connections 20 and 23. If parallel connection is desired, the connections 20 and 22, and 21 and 23 on FIGS. 5 and 6 would be joined, as shown on FIGS. 9 and 10, respectively, also with the drive voltage, "V", impressed across connections 20 and 23. Since the conductors are not in proximity, problems of high conductor-to-conductor potentials and inductive spikes which can be present in conventional series-wound bifilar windings driven with a bipolar drive are eliminated.

While the invention has been described, for convenience, as applied to an eight-pole, two-winding motor, it will be understood that the invention may be applied as well to a stepping motor having any number of poles, windings, or conductors within a winding. It will also be understood that a single "conductor", as an alternate to being formed of a single wire, may also be formed of two or more wires connected in parallel.

What has been disclosed is a novel monofilar winding for the poles of the stator of a stepping motor.

Since certain changes may be made in carrying out the above invention without departing from the scope thereof, it is intended that all matter contained in the above description or shown in the accompanying Drawing shall be interpreted as illustrative and not in a limiting sense.

It is also intended that the following Claims are intended to cover all of the generic and specific features of the invention herein described, and all statements of the scope of the invention which, as a matter of language, might be said to fall therebetween.

I claim:

1. A stator for a stepping motor, comprising:
   (a) a plurality of salient poles; and
   (b) at least two windings, each winding comprising at least two conductors each of which is wound upon at least one pole associated with that conductor only, the conductors within each winding being connected in series.

2. A stator for a stepping motor, comprising:
   (a) a plurality of salient poles; and
   (b) at least two windings, each winding comprising at least two conductors each of which is wound upon at least one pole associated with that conductor only, the conductors within each winding being connected in parallel.

3. A stepping motor, comprising:
   (a) a stator having a plurality of salient poles;
   (b) at least two windings, each winding comprising two conductors each of which is wound upon at least one pole associated with that conductor only, the conductors within each winding being connected in series;
   (c) means for passing an electric current through each winding in one direction to produce one magnetic polarization of the pole(s) upon which the winding is wound and for passing an electric current through the winding in the opposite direction to produce the opposite magnetic polarization of the pole(s) upon which the winding is wound; and
   (d) a moving member having means which magnetically interact with the poles;
   whereby, successive changes in polarization of the windings cause incremental changes in the position of the moving member.

4. The invention, as defined in claim 3, wherein the motor is of the rotary type.

5. A stepping motor, comprising:
   (a) a stator having a plurality of salient poles;
   (b) at least two windings, each winding comprising two conductors each of which is wound upon at least two poles associated with that conductor only, the conductors within each winding being connected in parallel;
   (c) means for passing an electric current through each winding in one direction to produce one magnetic polarization of the pole(s) upon which the winding is wound and for passing an electric current through the winding in the opposite direction to produce the opposite magnetic polarization of the pole(s) upon which the winding is wound; and
   (d) a moving member having means which magnetically interact with the poles;
   whereby, successive changes in polarization of the windings cause incremental changes in the position of the moving member.

6. The invention, as defined in claim 5, wherein the motor is of the rotary type.

7. A stepping motor system, comprising:
   (a) a stepping motor with a stator having a plurality of salient poles, with at least two windings, each winding comprising two conductors each of which is wound upon at least two poles associated with that conductor only, and with a moving member having means which magnetically interact with the poles; and
   (b) a bipolar drive connected to the windings, such that the conductors in each winding may be energized either in series or in parallel, for passing an electric current through each winding in one direction to produce one magnetic polarization of the pole(s) upon which the winding is wound and for passing an electric current through the winding in the opposite direction to produce the opposite magnetic polarization of the pole(s) upon which the winding is wound;
   whereby, successive changes in polarization of the windings cause incremental changes in the position of the moving member.

8. The invention, as defined in claim 7, wherein the motor is of the rotary type.

* * * * *